US009808112B2

(12) United States Patent
Favero et al.

(10) Patent No.: US 9,808,112 B2
(45) Date of Patent: Nov. 7, 2017

(54) DEVICE, SYSTEM AND METHOD FOR PREPARING A BEVERAGE FROM A CAPSULE

(71) Applicants: Koninklijke Douwe Egberts B.V., Ultrecht (NL); Koninklijke Philips Electronics N.V., Eindhoven (NL)

(72) Inventors: Andrea Favero, Quarto d'Altino (IT); Guiseppe Fin, Meolo (IT); Ka Cheung Tsang, Utrecht (NL); Ralf Kamerbeek, De Meern (NL); Hendrik Cornelis Koeling, Amersfoort (NL); Angenita Dorothea van Loon-Post, Utrecht (NL)

(73) Assignees: Koninklijke Douwe Egberts B.V., Utrecht (NL); Koninklijke Philips Electronics N.V., Eindhoven (NL)

( * ) Notice: Subject to any disclaimer, the term of this patent is extended or adjusted under 35 U.S.C. 154(b) by 966 days.

(21) Appl. No.: 13/765,517

(22) Filed: Feb. 12, 2013

(65) Prior Publication Data
US 2013/0224347 A1    Aug. 29, 2013

Related U.S. Application Data

(63) Continuation of application No. PCT/EP2011/062738, filed on Jul. 25, 2011.

(30) Foreign Application Priority Data

Dec. 13, 2010 (EP) .................................... 10194741

(51) Int. Cl.
*A47J 31/36* (2006.01)
*A47J 31/40* (2006.01)
*B65D 85/804* (2006.01)

(52) U.S. Cl.
CPC ......... *A47J 31/407* (2013.01); *A47J 31/3623* (2013.01); *A47J 31/3676* (2013.01); *B65D 85/8043* (2013.01); *A47J 31/368* (2013.01)

(58) Field of Classification Search
CPC .. A47J 31/3628; A47J 31/3623; A47J 31/368; A47J 31/3685; A47J 31/3695; A47J 31/3676; A47J 31/369; B65D 85/8043
(Continued)

(56) References Cited

U.S. PATENT DOCUMENTS 6,740,345 B2 * 5/2004 Cai .................... A47J 31/14
426/112
7,856,920 B2 * 12/2010 Schmed ............. A47J 31/0673
99/289 R
(Continued)

FOREIGN PATENT DOCUMENTS

EP    0 334 571    9/1989
EP    0 600 558    6/1994
(Continued)

OTHER PUBLICATIONS

International Search Report for International Application No. PCT/EP2011/062738, dated Nov. 3, 2011, 6 pages.
(Continued)

*Primary Examiner* — Reginald L Alexander
(74) *Attorney, Agent, or Firm* — Foley & Lardner LLP

(57) ABSTRACT

A system, device and method for preparing a beverage using a capsule. The capsule comprises a cup-shaped body, a lid and an actuating member. The device comprises a capsule holder, a fluid supply unit, and a flow control unit arranged for controlling a parameter of the fluid to be supplied to the capsule. The flow control unit is arranged for selectively operating in one of at least a first mode and a second mode. The flow control unit comprises a switching member mov-
(Continued)

able between a first and second position, and arranged for being engaged by the actuating member of the capsule. The system is arranged such that the flow control unit is in the first mode when the switching member is in the first position, and such that the flow control unit is in the second mode when the switching member is in the second position.

53 Claims, 7 Drawing Sheets

(58) Field of Classification Search
USPC .............................................. 99/295, 289 R
See application file for complete search history.

(56) References Cited

U.S. PATENT DOCUMENTS

| 8,074,560 | B2* | 12/2011 | Levi | A47J 31/3633 |
| | | | | 99/289 R |
| 8,459,179 | B2* | 6/2013 | Ozanne | A47J 31/407 |
| | | | | 426/232 |
| 2006/0144244 | A1* | 7/2006 | Girard | A47J 31/402 |
| | | | | 99/295 |
| 2007/0175335 | A1* | 8/2007 | Liverani | B65D 85/8043 |
| | | | | 99/279 |
| 2010/0147156 | A1* | 6/2010 | Colantonio | B65D 85/8043 |
| | | | | 99/295 |

FOREIGN PATENT DOCUMENTS

| EP | 1440637 | 7/2004 |
| EP | 2 050 372 | 4/2009 |
| WO | WO 2008/090122 | 7/2008 |

OTHER PUBLICATIONS

European Communication for Application No. 11735448.0, dated Nov. 22, 2013, 3 pages.

* cited by examiner

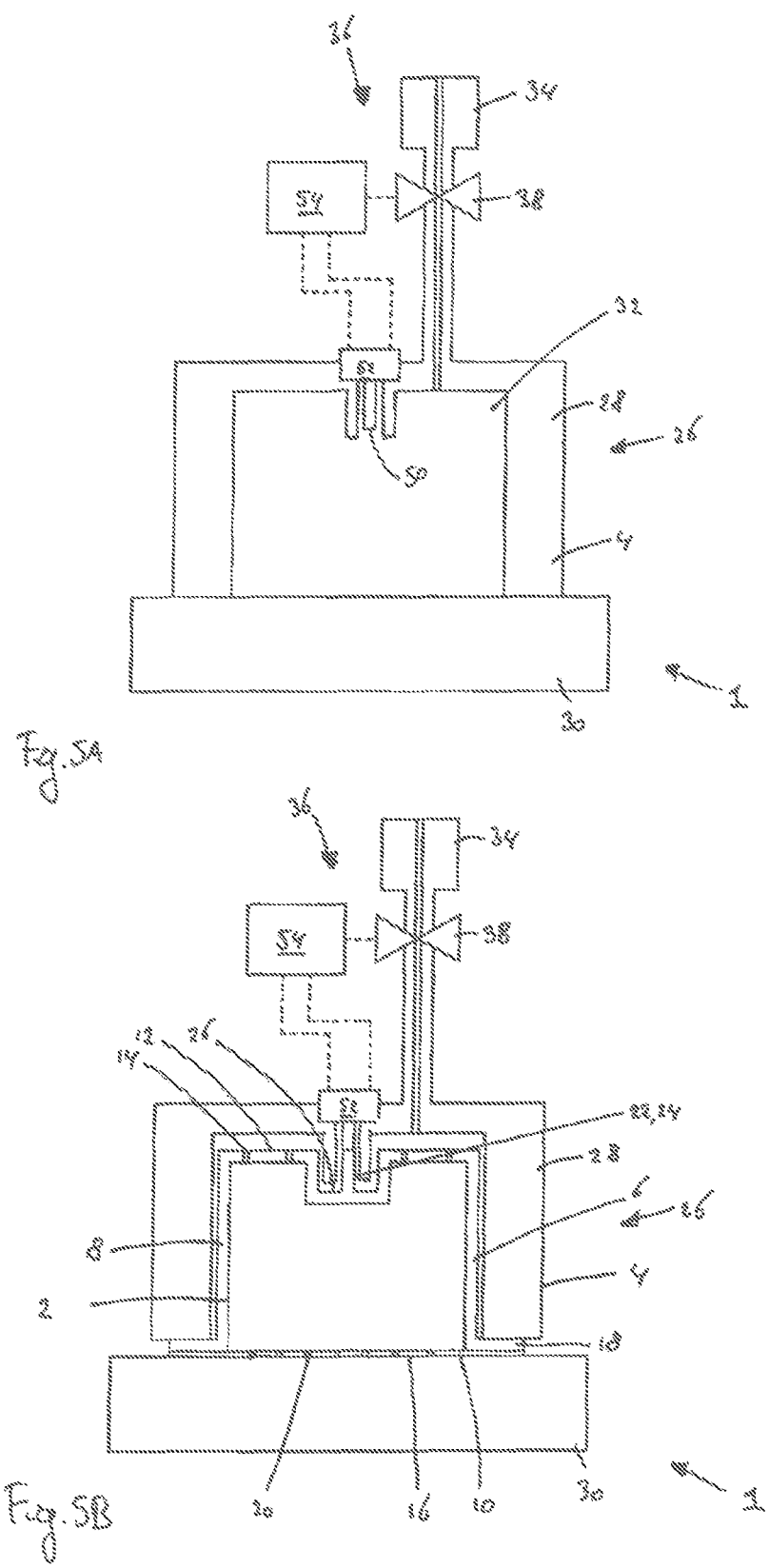

DEVICE, SYSTEM AND METHOD FOR PREPARING A BEVERAGE FROM A CAPSULE

CROSS REFERENCE TO RELATED APPLICATIONS

The present application is a continuation of International Patent Application Serial No. PCT/EP2011/062738 filed on Jul. 25, 2011; which claimed priority to Italian Application No. FI2010A000178 filed on Aug. 13, 2010, International Application No. PCT/EP2010/065199 filed on Oct. 11, 2010, European Application No. 10194741.4 filed on Dec. 13, 2010, and International Application No. PCT/EP2011/056682 filed on Apr. 27, 2011—all of which are hereby incorporated herein by reference.

BACKGROUND

The invention relates to a device for preparing a beverage suitable for consumption using a capsule comprising beverage ingredients. The invention also relates to a system comprising such beverage preparation device and a capsule, to a capsule for use in such system, and to a method for preparing a beverage suitable for consumption using a capsule comprising beverage ingredients.

Devices for preparing a beverage suitable for consumption from a capsule are known per se. Many devices rely on providing hot water under pressure to the capsule for preparing the beverage. It is common practice for consumers to rinse the device prior to and/or after preparing a serving of beverage.

Some devices provide a pre-programmed rinsing cycle. This has the disadvantage that the device requires additional controls, such as additional buttons or switches and/or additional operating software and/or additional fluid flow paths for the rinsing cycle to be performed. Hence, such device is more complex to operate than devices not providing the pre-programmed rinsing cycle.

Other systems rely on the consumer operating the device without introducing a capsule for rinsing the device. This provides a potential safety hazard, as a pressure sealing of the system may be less adequate when no capsule is present, while hot water, e.g. 90° C. or hotter, is forced through the device at pressures of potentially 10 Bar or higher.

It is also known to allow a user to select a volume of fluid to be supplied to the capsule. Thereto, the beverage preparation device may e.g. be provided with push buttons for selecting the desired volume. This provides the disadvantage that the user can select the "wrong" volume, i.e. a volume not associated with a beverage ingredient included in the capsule.

It is an object of the present invention to provide a system allowing for safer rinsing of the device while not complicating operation of the device. More in general, it is an object of the invention to provide a system which allows for more flexibility in preparing the beverage suitable for consumption. It is a further object of the invention to provide a system that is easy to operate for the consumer. It is further an object of the invention to provide a reliable system that is preferably robust against malfunction due to damage to parts of the system.

Thereto, according to the invention is provided a system for preparing a beverage comprising a beverage preparation device and a capsule, wherein the capsule comprises:
a, preferably substantially rigid, cup-shaped body,
a lid for closing the body, and
an actuating member;

wherein the device comprises:
a capsule holder arranged for holding the capsule,
a fluid supply unit arranged for supplying a fluid towards the capsule when the capsule is in the capsule holder,
a flow control unit arranged for controlling a parameter of the fluid to be supplied towards the capsule, wherein the flow control unit is arranged for selectively operating in one of at least a first mode and a second mode, wherein in the first mode the parameter is adjusted to a first level, and in the second mode the parameter is adjusted to a second level, different from the first level,
wherein the flow control unit comprises a switching member movable between a first position and a second position, and the switching member being arranged for being engaged by the actuating member of the capsule to be positioned in the first or second position when the capsule is in the capsule holder, and
wherein the system is arranged such that the flow control unit is in the first mode when the switching member is in the first position, and wherein the flow control unit is in the second mode when the switching member is in the second position,
wherein preferably the switching member is positioned in a first recess of an inner wall of the capsule holder, and/or
wherein preferably the actuating member is positioned in a second recess of an outer contour of the capsule.

Optionally, the switching member is recessed in the first recess with respect to the inner wall of the capsule holder, and/or the actuating member is recessed in the second recess with respect to the outer contour of the capsule.

Preferably, the parameter is one or more of flow rate, pressure and volume of the fluid to be supplied to the capsule. The parameter may also be one or more of temperature, time duration of supplying the fluid to the capsule, flow rate of the fluid to be supplied to the capsule as a function of time, pressure of the fluid to be supplied to the capsule as a function of time, volume of the fluid to be supplied to the capsule as a function of time, and temperature of the fluid to be supplied to the capsule as a function of time.

Thus, when the capsule having the actuating member is introduced into the device, the actuating member of the capsule may automatically engage the switching member to be positioned in the second position. Hence the flow control unit will be in the second mode. This causes the device to provide the fluid with the parameter, e.g. the flow rate and/or pressure, at the second level. Preferably, the second level is set so as to allow the beverage to be prepared. Alternatively, when no capsule is introduced into the device, no actuating member will be present, so that the switching member may be in the first position. Hence, the flow control unit will be in the first mode. In this case the device automatically provides the fluid with the parameter, e.g. the flow rate and/or pressure, at the first level. This may be referred to as a default mode. It will be appreciated that the first level may be set so as to provide sufficient flow rate and/or pressure for rinsing the device, whereas the first level flow rate and/or pressure may be set to be sufficiently low to remove, or at least diminish, the risk presented to the user. Thereto, the flow rate and/or pressure in the first mode may be smaller than the flow rate and/or pressure in the second mode. It will be appreciated that both the first level and the second level are to be chosen such that the flow rate and pressure of the fluid supplied to the capsule are non-zero.

Alternatively, when a capsule not having an actuating member is introduced into the device, no actuating member will be present, so that the switching member may be in the first position. Hence, the flow control unit will be in the first mode. In this case, the device automatically provides the fluid with the parameter, e.g. the flow rate and/or pressure, at the first level. The first level may be set so as to allow a first type of beverage to be prepared. When a capsule having the actuating member is introduced into the device, the actuating member of the capsule may automatically engage the switching member to be positioned in the second position. Hence the flow control unit will be in the second mode. This automatically causes the device to provide the fluid with the parameter, e.g. the flow rate and/or pressure, at the second level. The second level may be set so as to allow a second type of beverage to be prepared. This may provide versatility in the preparation of beverages. It is for instance possible to prepare a first type of beverage at a lower pressure, e.g. tea or American coffee, using the first mode and to prepare a second type of beverage at a higher pressure, e.g. espresso coffee, using the second mode.

Alternatively, when a first capsule having an actuating member is introduced into the device the actuating member of the first capsule may automatically engage the switching member to be positioned in the first position. Hence, the flow control unit will be in the first mode. In this case, the device automatically provides the fluid with the parameter, e.g. the flow rate and/or pressure, at the first level. The first level may be set so as to allow a first type of beverage to be prepared using the first capsule. When a second capsule having a different actuating member is introduced into the device, the different actuating member of the second capsule may automatically engage the switching member to be positioned in the second position. Hence the flow control unit will be in the second mode. This automatically causes the device to provide the fluid with the parameter, e.g. the flow rate and/or pressure, at the second level. The second level may be set so as to allow a second type of beverage to be prepared using the second capsule. This may provide versatility in the preparation of beverages. It is for instance possible to prepare a first type of beverage at a lower pressure, e.g. tea or American coffee, using the first mode and a first capsule having an actuating member, and to prepare a second type of beverage at a higher pressure, e.g. espresso coffee, using the second mode and a second capsule having a different actuating member.

It will be appreciated that the switching member being recessed in a first recess with respect to the inner wall of the capsule holder provides the advantage that the switching member is protected from damage, e.g. by foreign objects. It will be appreciated that the actuating member being recessed in a second recess with respect to the outer contour of the capsule, provides the advantage that the actuating member is protected from damage, e.g. during manufacture, transport or handling of the capsule. Thus, the system according to the invention is robust. Optionally, the switching member is recessed with respect to the inner wall of the capsule holder, and the actuating member is recessed with respect to the outer contour of the capsule.

Optionally, the inner wall of capsule holder comprises a protruding portion, and the switching member is recessed with respect to said protruding portion. This provides the advantage that the protruding portion may form a protecting wall surrounding the switching member.

Optionally, the protruding portion of the inner wall of the capsule holder extends into the second recess of the capsule when the capsule is in the capsule holder. Hence, the capsule and the device may mesh, providing extra protection for the switching member and the actuating member.

Optionally, the actuating member, such as the protrusion, is positioned at an axis of symmetry of the capsule. The axis of symmetry may be such that the capsule is rotation symmetric about said axis. This provides the advantage that the rotational orientation of the capsule within the device is not important and the actuating member will always be correctly positioned with respect to the device, so that insertion of the capsule into the device is easy for the consumer.

Optionally, the switching member is positioned at an axis coaxial with the axis of symmetry of the capsule when the capsule is in the capsule holder. Thus, the switching member may be positioned such that the rotational orientation of the capsule within the device is not important and the actuating member will always be correctly positioned with respect to the switching member. The switching member may be positioned at an axis of symmetry of the capsule holder. More in general, at least part of the switching member may be positioned coaxial with the actuating member when the capsule is in the capsule holder.

In an embodiment, the actuating member is a projection of the capsule. This provides for ease of manufacture of a capsule including the actuating member. Also the projection can engage the switching member, in a simple manner. The switching member may be part of a switch, preferably arranged to interact with the projection of the capsule.

Preferably, the projection is comprised in the second recess of the capsule, such that the projection substantially resides within an outer contour of the cup-shaped body. Hence, the projection is protected against deformation or other damage during manufacture, transport or handling. Hence, the correct functioning of the projection can be assured. Thus, the protruding portion of the inner wall of the capsule holder may extend into the second recess of the capsule when the capsule is in the capsule holder, while the actuating member, in the form of the projection of the capsule, extends into the protruding portion of the inner wall of the capsule holder for engaging the switching member that is recessed in the first recess within the protruding portion.

Preferably, a maximum width of the second recess is less than six times a minimum width of the projection, more preferably less than four times. Hence, the projection is closely held in the recess, even better protecting against damage or tampering.

Optionally, the system comprises optical detection means for detecting the position of the switching member. Hence, mechanical wear of the system is minimized. The optical detection means may comprise at least one light barrier unit. Such light barrier units are known per se and normally include a light source and a light detector. The light source and light detector are normally positioned facing each other along an optical path. The switching member may comprise a vane for selectively obstructing or freeing an optical path of the at least one light barrier unit.

Optionally, the system comprises magnetic detection means for detecting the position of the switching member. Thus too, mechanical wear may be minimized. The magnetic detection means may comprise at least one magnetic induction sensor. The switching member may comprise a magnetic indicator, such as a magnet or a magnetisable part, for being detected by the magnetic induction sensor. Normally the magnetic indictor is detected when sufficiently close to the magnetic induction sensor, and is not detected when sufficiently remote from the magnetic induction sensor. This provides a simple way of determining whether the magnetic indictor is at a predetermined position near the magnetic induction sensor or not.

Optionally, the system comprises optical detection means for detecting the position of the actuating member. The optical detection means may comprise at least one light barrier unit. The actuating member may comprises a vane for selectively obstructing or freeing the optical path of the at least one light barrier unit.

Optionally, the system comprises magnetic detection means for detecting the position of the actuating member. The magnetic detection means may comprise at least one magnetic induction sensor. The actuating member comprises a magnetic indicator for being detected by the magnetic detection means.

Optionally, the flow control unit comprises a valve for controlling the flow rate of the fluid. Alternatively, the flow control unit comprises a valve for controlling the pressure of the fluid. Alternatively, the flow control unit comprises a valve for controlling the flow rate and/or the pressure of the fluid. Hence, the flow rate and/or pressure can be controlled in a simple manner.

Optionally, the valve is mechanically actuated by the actuating member of the capsule. This provides for a mechanically simple and reliable system. The actuating member of the capsule, e.g. the projection, may e.g. interact, directly or indirectly, with a stem or head of the valve. The switching member may e.g. be coupled with the stem or head. The switching member may e.g. be part of the stem or head of the valve.

Alternatively, or additionally, the valve is actuated by an electronic, electric, magnetic, pneumatic and/or hydraulic actuator. Said electronic, electric, magnetic, pneumatic and/or hydraulic actuator may be activated by the switching member. The switching member may e.g. be part of an electrical switch, actuation of which causes the valve to be actuated electrically, magnetically, pneumatically and/or hydraulically. The switching member may also be part of a pneumatic or hydraulic switch actuation of which causes the valve to be actuated electrically, magnetically, pneumatically and/or hydraulically.

Optionally, the valve is arranged such that the flow rate and/or pressure in the first mode is smaller than the flow rate and/or pressure in the second mode.

Optionally, the flow control unit is arranged for instructing the fluid supply unit to control the flow rate and/or pressure of the fluid to be supplied to the capsule.

Optionally, the valve is designed as a leaking valve, such that in the first mode the valve is in a closed position but allowed to leak, and in the second mode the valve is in an open position. The valve switching between the closed and the open position, wherein in the closed position the valve leaks, in a very simple manner provides that the flow rate and/or pressure in the first mode differs from the flow rate and/or pressure in the second mode. The leaking valve in a simple manner may provide the flow rate and/or pressure at the first level, e.g. for rinsing.

Optionally, the switching member is in the first position when the switching member is not engaged by an actuating member of a capsule. This provides any easy activation of the first mode, e.g. as rinse mode.

Optionally, the switching member is in the second position upon engagement by an actuating member of a capsule. Optionally, the switching member is in the first position upon engagement by a different actuating member of a capsule.

Optionally, the flow control unit is arranged for further operating in a third mode, wherein in the third mode the parameter, e.g. the flow rate, volume and/or pressure, is adjusted to a third level, different from the first level and the second level. It will be appreciated that the flow control unit may also be arranged to operate in more than three different modes. The third mode may be activated by the capsule having a second actuating member differing from the actuating member activating the second mode. The second actuating member may also differ from an actuating member activating the first mode. Optionally, the switching member is in a third position upon engagement by the second actuating member of a capsule. Nevertheless, the second actuating member is preferably located at the same position on the capsule and preferably differs in only one aspect, e.g. the length of the protrusion.

Providing more than two modes to be actuated with the similar actuating members provides the advantage that not a plurality of actuating members needs to be present on a single capsule, but that a single actuating member per capsule suffices. For instance, a single protrusion of the capsule may cause the device to operate in one of more than two modes by its length when present and/or by its absence. This can even more easily be implemented when the actuating member is positioned at the axis of symmetry of the capsule as described hereinabove.

The control unit may also be arranged to allow stepless control of the parameter, e.g. the flow rate, volume and/or pressure, between a minimum and maximum level. The length of the projection may be representative for the flow rate and/or pressure and/or volume. It is possible that the flow rate is proportional to a length of the projection of the capsule. It is also possible that the pressure is proportional to the length of the projection of the capsule. It is also possible that the volume is proportional to the length of the projection of the capsule.

Optionally, the system comprises a first capsule and a second capsule. The first capsule may comprise a first actuating member. The second capsule may comprise a second actuating member, different from the first actuating member. The first actuating member may be arranged to have the flow control unit operate in the second mode. The second actuating member may be arranged to have the flow control unit operate in the third mode. The first actuating member may e.g. be a projection having a first length and the second actuating member may be a similar projection, at the same position on the capsule, but having a second length, different from the first length.

Thus, when the capsule having the first actuating member is introduced into the device, the first actuating member of the capsule automatically causes the device to provide the fluid with the parameter, e.g. the flow rate and/or pressure, at the second level. The second level may be set so as to allow a first type of beverage to be prepared. When the capsule having the second actuating member is introduced into the device, the second actuating member of the capsule automatically causes the switching member to be in a third position. This causes the device to provide the fluid with the parameter, e.g. the flow rate and/or pressure, at the third level. The third level may be set so as to allow a second type of beverage to be prepared. This may provide versatility in the preparation of beverages. It is for instance possible to prepare the first type of beverage at a lower pressure, e.g. tea or American coffee, and to prepare the second type of beverage at a higher pressure, e.g. espresso coffee. Additionally, when no capsule is introduced into the device, no actuating member will be present, so that the device automatically provides the fluid with the flow rate and/or pressure at the first level. It will be appreciated that the first level may be set so as to provide sufficient flow rate and/or pressure for rinsing the device, whereas the first level flow rate and/or pressure may be set to be sufficiently low to remove, or at least diminish, the risk presented to the user. Thereto, the flow rate and/or pressure in the first mode may be smaller than the flow rate and/or pressure in the second mode and the third mode. It will be appreciated that causing the device to provide the fluid with the flow rate and/or pressure at the first level may also be obtained by providing a third capsule with a further actuating member, having a length different from the first and second actuating members. This may also be utilised for preparing a third type of beverage.

Optionally, the capsule of the system comprises a beverage ingredient, preferably an extractable product, such as roast and ground coffee.

Optionally, the capsule comprises porous and/or perforate entrance face and/or exit face for allowing fluid to enter and/or beverage to exit the capsule, respectively.

Optionally, the capsule suitable for use in the beverage preparation device according to the invention comprises a cleaning agent and/or descaling agent for cleaning and/or descaling the device, respectively. Suitable cleaning agents and descaling agents are known per se. It will be appreciated that the capsule comprising the cleaning agent and/or descaling agent need not necessarily comprise an actuating member, since cleaning and/or descaling may be performed in the default mode as described hereinabove.

The invention also relates to a beverage preparation device of the system as described hereinabove. Such device may comprise a capsule holder arranged for holding a capsule, a fluid supply unit arranged for supplying a fluid towards the capsule when the capsule is in the capsule holder, a flow control unit arranged for controlling a parameter of the fluid to be supplied towards the capsule, wherein the flow control unit is arranged for selectively operating in one of at least a first mode and a second mode, wherein in the first mode the parameter is adjusted to a first level, and in the second mode the parameter is adjusted to a second level, different from the first level, wherein the flow control unit comprises a switching member movable between a first position and a second position, the switching member being arranged for being engaged by the actuating member of the capsule to be positioned in the first or second position when the capsule is in the capsule holder, and wherein the flow control unit is arranged such that the flow control unit is in the first mode when the switching member is in the first position, and wherein the flow control unit is in the second mode when the switching member is in the second position. Optionally, the switching member is positioned in a first recess of an inner wall of the capsule holder.

The beverage preparation device may be part of a more complex machine, for example a coffee machine, equipped with additional members known per se such as one or more of a water reservoir, heater, a pump for supplying water under pressure, a beverage dispensing spout, a waste container for used capsules, etc.

The invention also relates to a capsule of the system according to the invention. As mentioned, such capsule may comprise a beverage ingredient. It is also possible that such capsule comprises a cleaning agent and/or descaling agent for cleaning and/or descaling the beverage preparation device as described hereinabove. It will be clear that such capsule may comprise an actuating member. Such capsule may also lack an actuating member, e.g. to activate a default mode of the beverage preparation device.

According to an aspect of the invention is provided a capsule for preparing a consumable beverage in a beverage preparation device, comprising:

a, preferably substantially rigid, cup-shaped body,
a lid for closing the body, and
an actuating member arranged for engaging a switching member of the beverage preparation device.

It will be appreciated that such capsule may be used for preparing the beverage in the beverage preparation device of the system as described hereinabove. Such capsule may engage the switching member of said beverage preparation device.

Preferably, the actuating member is a projection of the capsule. This can be manufactured easily. The projection may e.g. be a pin extending from the cup-shaped body. The pin may e.g. be 0.5-4 mm wide. The pin may e.g. be 1-6 mm long.

The cup-shaped body may substantially be manufactured from a plastics material, e.g. by means of injection moulding. The projection may be a, purposive, elongation of the injection location of the cup-shaped body. Hence the projection can easily be incorporated in the design of the cup-shaped body.

Optionally, the projection is comprised in a recess of the capsule, such that the projection substantially resides within the outer contour of the cup-shaped body. Hence, the projection is protected against deformation or other damage during manufacture, transport or handling. Hence, the correct functioning of the projection can be assured.

Alternatively, the actuating member is a recess of the capsule. A depth of the recess may cause the switching member to differentiate between the first and second (and optional further) positions.

Optionally, the recess is positioned in the cup-shaped body opposite the lid.

Optionally, the actuating member is positioned at the cup-shaped body opposite the lid. The actuating member is preferably positioned at an outer surface of the cup-shaped body.

Optionally, the actuating member is positioned at an axis of symmetry of the capsule. The axis of symmetry may be such that the capsule is rotation symmetric about said axis. This provides the advantage that the rotational orientation of the capsule within the device is not important and the actuating member will always be correctly positioned with respect to the device, so that insertion of the capsule into the device is easy for the consumer.

Optionally, the actuating member and the cup-shaped body form a monolithic part.

Optionally, the capsule comprises a circumferential rim. Preferably, the circumferential rim extends outwardly of the cup-shaped body at an open end thereof. Preferably the capsule comprises a lid closing the open end.

Preferably, the capsule comprises (a volume of) a beverage ingredient, such as an extractable product, such as roast and ground coffee. The capsule may comprise a porous and/or perforate entrance face and/or exit face for allowing fluid to enter and/or beverage to exit the capsule, respectively.

Such capsule may also form part of a kit, preferably as second capsule of the kit. Such kit may comprise a first capsule for preparing a first consumable beverage and a second capsule for preparing a second consumable beverage in a beverage preparation device, each capsule comprising:

a, preferably substantially rigid, cup-shaped body,
a lid for closing the body,
a volume of beverage ingredient,
wherein the first capsule comprises no actuating member arranged for engaging a switching member of the beverage preparation device, and
wherein the second capsule comprises an actuating member, arranged for engaging the switching member of the beverage preparation device.

It will be appreciated that such capsules may be used for preparing the beverages in the beverage preparation device of the system as described hereinabove. Such capsules may either engage or not engage the switching member of said beverage preparation device.

Thus, the first beverage may be prepared with the fluid at the first flow rate/and or pressure while the second beverage may be prepared with the fluid at the second flow rate and/or pressure. It will be appreciated that the first beverage ingredient may differ from the second beverage ingredient.

The invention also relates to a kit comprising a first capsule for preparing a first consumable beverage and a second capsule for preparing a second consumable beverage in a beverage preparation device, each capsule comprising:
a, preferably substantially rigid, cup-shaped body,
a lid for closing the body,
a volume of beverage ingredient,
wherein the first capsule comprises a first actuating member arranged for engaging a switching member of the beverage preparation device, and
wherein the second capsule comprises a second actuating member, different from the first actuating member, arranged for engaging the switching member of the beverage preparation device.

It will be appreciated that such capsules may be used for preparing the first and second beverages in the device of the system as described hereinabove. Such first capsule may be arranged to engage the switching member of said beverage preparation device such that the switching member is in the first position, and the flow control unit operates in the first mode. Such second capsule may be arranged to engage the switching member of said beverage preparation device such that the switching member is in the second position and the flow control unit operates in the second mode. Alternatively, such first capsule may be arranged to engage the switching member of said beverage preparation device such that the switching member is in the second position and the flow control unit operates in the second mode. Such second capsule may then be arranged to engage the switching member of said beverage preparation device such that the switching member is in the third position and the flow control unit operates in the third mode.

Optionally a dimension of the first actuating member differs from a dimension of the second actuating member.

The first actuating member may be a first projection of the first capsule. The second actuating member may be a second projection of the second capsule. The second projection may be taller than the first projection. The first or second projection may e.g. be a pin extending from the cup-shaped body. The pin may e.g. be 0.5-4 mm wide. The pin may e.g. be 1-6 mm long.

The cup-shaped bodies may substantially be manufactured from a plastics material, e.g. by means of injection moulding. The projections may be, purposive, elongations of the injection location of the cup-shaped bodies.

Optionally, the projections are comprised in recesses of the capsules, such that the projections substantially reside within the outer contours of the cup-shaped bodies.

Alternatively, the first actuating member may be a first recess of the first capsule. The second actuating member may be a second recess of the second capsule. A depth of the first recess may differ from a depth of the second recess.

Optionally, the actuating members and the respective cup-shaped bodies form monolithic parts.

Preferably, the first capsule comprises a first beverage ingredient. Preferably, the second capsule comprises a second beverage ingredient. Preferably the first beverage ingredient is different from the second beverage ingredient. Hence, the first beverage may be prepared using the first beverage ingredient and the fluid at one flow rate and/or pressure. Hence, the second beverage may be prepared using the second beverage ingredient and the fluid at a different flow rate and/or pressure.

The first beverage ingredient may differ from the second beverage ingredient e.g. in volume, mass, density, composition, grind size, or the like.

The first and/or second beverage ingredient may be an extractable product such as roast and ground coffee.

The capsules may comprise porous and/or perforate entrance faces and/or exit faces for allowing fluid to enter and/or beverage to exit the capsules, respectively.

The invention also relates to a kit comprising a first capsule comprising a cleaning and/or descaling agent and a second capsule e.g. comprising a beverage ingredient. Herein, the first capsule may be arranged to cause the beverage preparation device to be in the first mode and the second capsule may be arranged to cause the beverage preparation device to be in the second mode as described hereinabove.

The invention also relates to a method for preparing a beverage suitable for consumption from a capsule comprising a beverage ingredient, comprising:
providing a capsule comprising:
a, preferably substantially rigid, cup-shaped body, and
a lid for closing the body;
providing a beverage preparation device comprising:
a capsule holder arranged for holding the capsule,
a fluid supply unit arranged for supplying a fluid towards the capsule when the capsule is in the capsule holder, and
selectively providing a fluid towards the capsule in one of at least a first mode and a second mode, wherein in the first mode the parameter, e.g. the flow rate and/or pressure, of the fluid to be supplied to the capsule is adjusted to a first level, and in the second mode the parameter, e.g. the flow rate and/or pressure, is adjusted to a second level, different from the first level, depending on the presence and/or absence of an actuating member of the capsule.

The invention also relates to a method for preparing a beverage suitable for consumption from a capsule comprising a beverage ingredient, comprising:
providing a capsule comprising:
a, preferably substantially rigid, cup-shaped body,
a lid for closing the body, and
an actuating member;
providing a beverage preparation device comprising:
a capsule holder arranged for holding the capsule,
a fluid supply unit arranged for supplying a fluid towards the capsule when the capsule is in the capsule holder, and
selectively providing a fluid to the capsule in one of at least a first mode and a second mode, wherein in the first mode a parameter, e.g. flow rate and/or pressure, of the fluid to be supplied to the capsule is adjusted to a first level, and in the second mode the parameter, e.g. the flow rate and/or pressure, is adjusted to a second level, different from the first level, depending on the actuating member of the capsule.

The invention also relates to the use of a capsule in a beverage preparation device according to the invention for preparing a beverage.

BRIEF DESCRIPTION OF THE DRAWINGS

The invention will now be elucidated by means of non-limiting examples referring to the drawing in which

FIGS. 5A and 5B show a schematic representation of a third example of a system according to the invention;

Throughout the figures like elements are indicated with like reference numerals.

DETAILED DESCRIPTION OF EXEMPLARY EMBODIMENTS

Figure 1A:
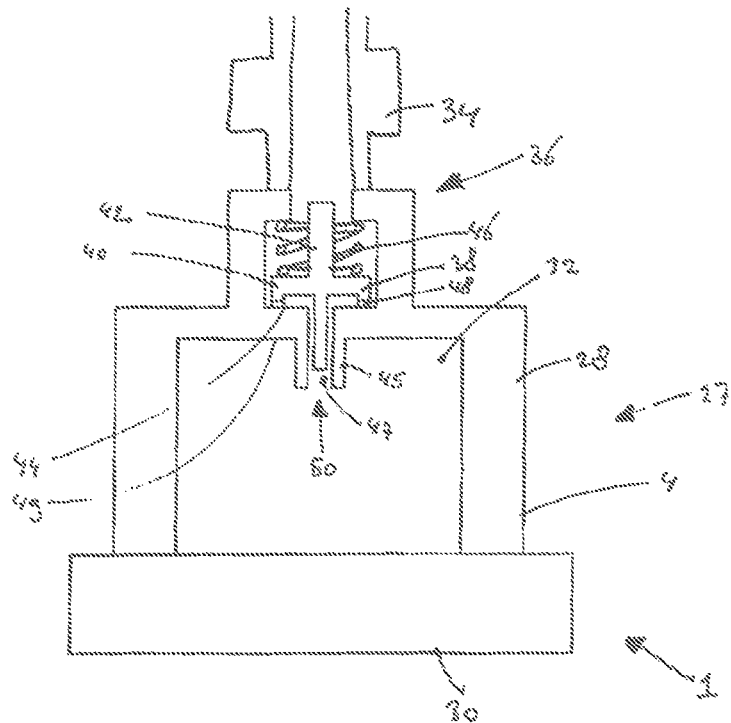
FIGS. 1A and 1B show schematic representations of a first example of a system according to the invention.
Figure 1B:
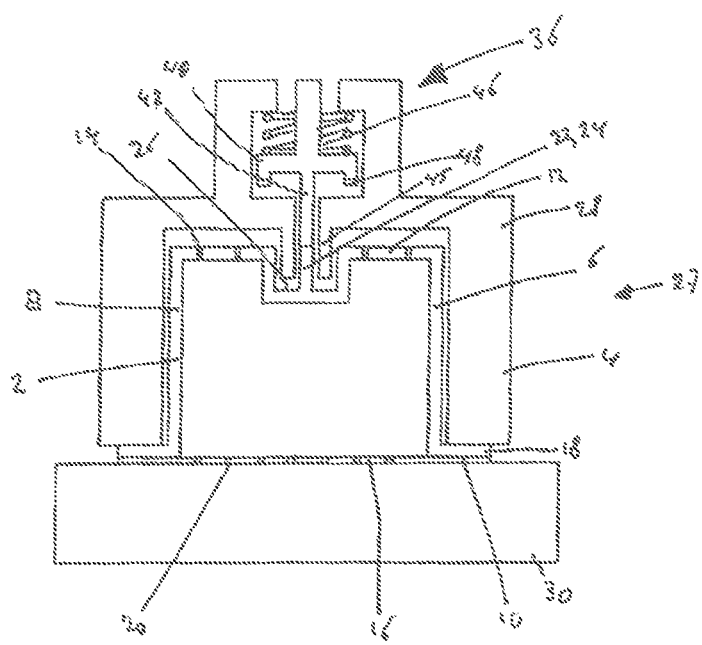

FIGS. 1A and 1B show a schematic representation of a first example of a system 1 according to the invention. The system 1 comprises a capsule 2 and a beverage preparation device 4 for preparing a beverage using the capsule 2. The capsule of FIG. 1B is shown in more detail in FIG. 2.

In this example, the capsule 2 comprises a substantially rigid cup-shaped body 6. The cup-shaped body 6 comprises a circumferential wall 8. Here the circumferential wall 8 is depicted as being substantially cylindrical, although it will be appreciated that other shapes are possible, such as frustoconical, (hemi)spherical, polygonal, etc. In this example, the capsule 2 further comprises a lid 10. In the example, the lid 10 closes an open end of the body 6.

In this example the capsule 2 further comprises an entrance face 12. Here, the entrance face 12 is part of the cup-shaped body 6. The entrance face 12 is arranged for allowing a liquid, such as hot water, to enter the capsule 2 for interacting with a beverage ingredient contained within the capsule 2. In this example the entrance face is integral with the cup-shaped body 6, closing the circumferential wall 8 at a first end. Also, in the examples the entrance face 12 is provided with perforations 14 for allowing the liquid to enter the capsule 2. It will be appreciated that the entrance face 12 may also be porous. Alternatively, the entrance face 12 may be fluid tight, e.g. in case the device is arranged for opening, such as by piercing, the entrance face 12 for allowing the liquid to enter the capsule 2.

In this example the capsule 2 further comprises an exit face 16. The exit face 16 is arranged for allowing the beverage and/or liquid to exit the capsule, e.g. after interaction with the beverage ingredient. In this example, the exit face is formed by the lid 10. In the examples the exit face 16 is a separate sheet connected to an outwardly extending flange-like rim 18 of the capsule. Here the rim 18 is integral with the circumferential wall 8. Here the exit face 16 closes the capsule at a second end. In this example the exit face 16 is a sheet comprising a plurality of exit openings 20. It will be appreciated that the exit face 16 may also be porous. Alternatively, the exit face 16 may be fluid tight, e.g. in case the device is arranged for opening, such as by piercing, the exit face 16 for allowing the beverage and/or liquid to exit the capsule.

In this example, the capsule 2 has an axis of symmetry, such that the capsule is rotation symmetric about said axis. In this example the capsule 2 is asymmetrical with respect to the plane in which the rim 18 extends.

Figure 2:
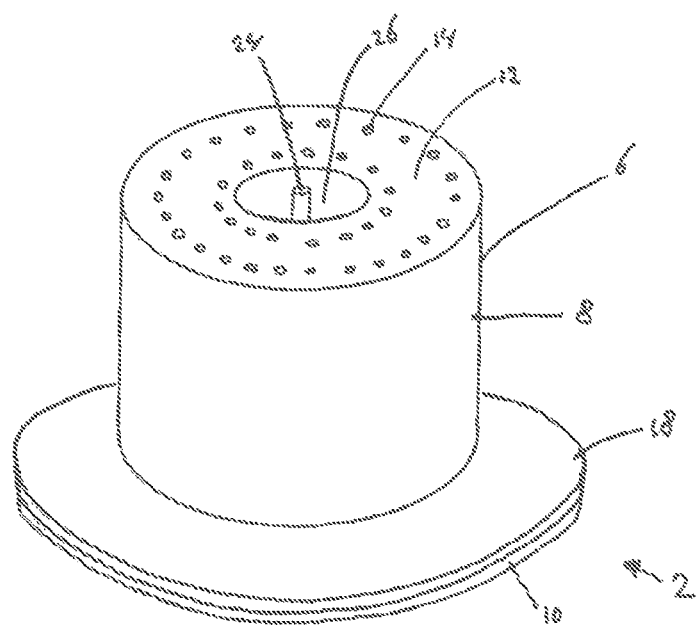
FIG. 2 shows an example of a capsule according to the invention.

As can be seen in FIG. 1B and FIG. 2, the capsule 2 further comprises an actuating member 22. In this example, the actuating member 22 is designed as a projection 24. In this example, the projection 24 is positioned in a recess 26. In FIG. 1B can be seen that the distal end of the projection 24 is substantially flush with the entrance face 12. Hence, the projection 24 substantially resides within an outer contour of the cup-shaped body 6. This provides the advantage that the projection 24 is protected against deformation or other damage during manufacture, transport or handling.

In this example, the actuating member 22 is an integral part of the cup-shaped body 6. In this example, the actuating member 22 is positioned on the axis of symmetry of the capsule. In this example the projection 24 extends along the axis of symmetry of the capsule. In this example, also the recess 26 is positioned symmetrically around the axis of symmetry.

The device 4 of the system 1, comprises a capsule holder 27 for holding the capsule 2. In this example, the capsule holder 27 comprises an enclosing member 28 and a support plate 30. The enclosing member and support plate 30 together enclose a brew chamber 32. When preparing a beverage, a capsule 2 will be positioned within the brew chamber 32.

In this example, the device 4 further comprises a fluid supply unit 34. The fluid supply unit 34 is arranged for supplying a fluid to the capsule 2. In this example the fluid supply unit 34 is arranged for supplying hot water under pressure to the capsule 2.

As can be seen in FIGS. 1A and 1B, the device 4 further comprises a flow control unit 36. The flow control unit 36 is arranged for controlling a flow rate and/or pressure of the fluid to be supplied to the capsule 2. In this example the flow control unit 36 comprises a valve 38. In this example, the valve 38 comprises a valve head 40 and a stem 42. As can be seen in FIG. 1A, in this example the stem 42 extends on both sides of the valve head 40. The valve 38 further comprises a seat 44 and a spring 46. The spring 46 pushes the valve head 40 against the seat 44 to a closed position. It will be appreciated that a flow rate of fluid through the valve 38 can be controlled by controlling the distance the valve head 40 is lifted off the seat 44. In this example, the valve head is provided with grooves 48. The grooves 48 traverse the surface of the valve head 40 that is in contact with the seat 44 in the closed position. As a result, the valve 38 will purposively leak when in the closed position. That is, when the valve head 40 abuts the seat 44, the grooves define a minimum flow rate or minimum pressure of the fluid that passes the valve 38. Said minimum flow rate and said minimum pressure are greater than zero.

The system 1 as described thus far can be operated as follows.

The system 1 can selectively be operated in a first mode and in a second mode. FIG. 1A depicts the system 1 being used in the first mode. FIG. 1B depicts the system 1 being used in the second mode.

In the first mode, in this example, no capsule 2 is inserted into the brew chamber 32. Then, the valve head 40 abuts against the seat 44 and fluid is supplied to the brew chamber 32 at said minimum flow rate and/or said minimum pressure. Herein the stem 42 assumes a first position. Hence, in the first mode the flow rate and/or pressure is adjusted to a first level. The flow rate and/or the pressure is sufficient for rinsing the beverage preparation device 4. It will be appreciated that the minimum flow rate and/or minimum pressure can be chosen so as to reduce the risk of hot water under pressure being dangerously ejected from the brew chamber during rinsing.

In the second mode, in this example, the capsule 2 is inserted into the brew chamber 32. Then, the actuating member 22 of the capsule 2 abuts the stem 42 of the valve 38. The length of the projection 24 and the length of the stem 42 are adapted to each other so that the valve head 40 is automatically lifted off the seat 44 by a predetermined distance when the brew chamber 32 is formed by the enclosing member 28 and the support plate 30 enclosing the capsule 2. Thus, the stem 42 assumes a second position. Hence, the valve 38 is actuated from the closed position to the open position and fluid is supplied to the brew chamber 32 wherein a flow rate and/or pressure is adjusted to a second level. The flow rate and/or the pressure in the second mode will be higher than the flow rate and/or pressure in the first mode. It will be appreciated that the flow rate and/or pressure in the second mode can be chosen according to a desired flow rate and/or pressure for preparing a beverage using the capsule 2.

Also, in the second mode, the fluid will be supplied to the capsule 2. The fluid will enter the capsule 2 through the entrance face 12. In the inner space of the capsule 2, the fluid will interact with the beverage ingredient included in the capsule 2, thus forming the beverage. The beverage exits the capsule 2 through the exit face 16. In this example, the beverage exits the brew chamber through the support plate 30. Thereto the support plate may be provided with openings (not shown) for guiding the beverage towards a container, such as a cup.

Thus, more in general, the flow control unit 36 is arranged for selectively operating in one of a first mode and a second mode. In the first mode the flow rate and/or pressure is adjusted to a first level. In the second mode the flow rate and/or pressure is adjusted to a second level, different from the first level. In general, the flow control unit 36 comprises a switching member 50, here formed by the valve 38, more in particular by the stem 42 of the valve 38, arranged for selectively being engaged by the actuating member 22 of the capsule. Said switching member 50 is coupled with the flow control unit 36, here forms an integral part of the flow control unit 36, such that the flow control unit 36 is switched in the first mode or in the second mode depending on the actuating member 22. In this example, the flow control unit 36 is in the first mode when the switching member is not engaged by the actuating member 22 (the switching member is in a first position), and is in the second mode when the switching member is engaged by the actuating member 22 of the capsule (the switching member is in a second position).

It will be appreciated that the actuating member 22 within the recess 26 can be detected by the switching member. Thus, the recess 26 forms a detection chamber 43 wherein the actuating member 22 can be detected, but is protected from damage.

In the example of FIGS. 1A and 1B, the enclosing member 28 comprises a tubular member 45. The tubular member 45 forms a protruding portion of an inner wall 49 of the enclosing member 28. The stem 42, i.e. the switching member 50, is positioned within a recess 47 of inner wall 49, formed by the tubular member 45. It will be appreciated that the stem 42, i.e. the switching member 50, within the recess 47 can be detected by the projection 24 of the capsule 2. Thus, the recess 47 also forms a detection chamber 43 wherein the actuating member can interact with the stem 42, but wherein both the actuating member 22 and the stem 42, i.e. the switching member 50, are protected from damage.

It will be appreciated that in this example the capsule 2 comprises the recess 26 which is arranged such that when the capsule 2 is in the capsule holder 27, the tubular member 45 of the capsule holder 27 projects into the recess 26, while the tubular member 45 has the recess 47 into which the projection 24 of the capsule 2, located within the recess 26, projects, the recess 47 further housing the switching member 50.

Figure 3:
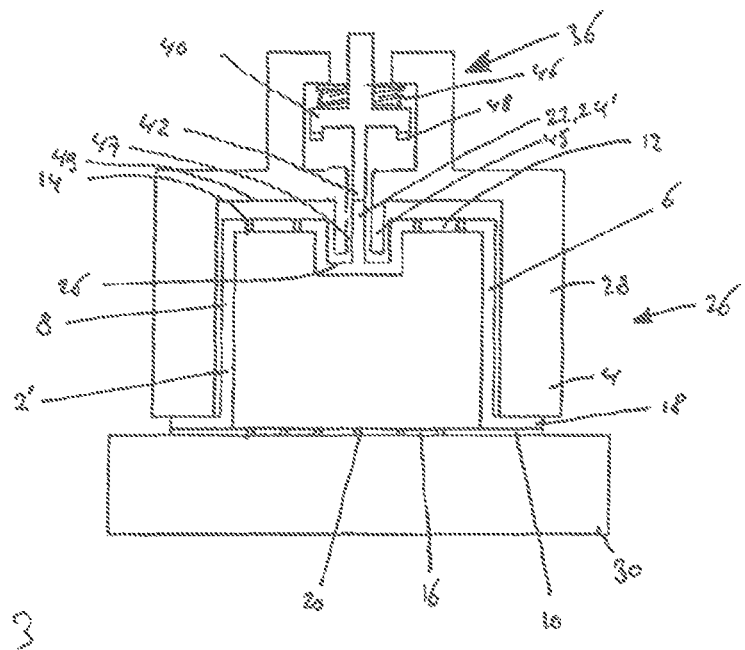
FIG. 3 shows a schematic representation of a second example of a system according to the invention.

FIG. 3 shows a schematic representation of a second example of a system 1 according to the invention. FIG. 3 is similar to FIG. 1B. The device 4 of the system of FIG. 3 may be identical to the device 4 of the system of FIG. 1B. The system of FIG. 3 comprises a second capsule 2' which differs from the capsule 2 shown in FIG. 1B (also referred to as first capsule 2). In the example of FIG. 3, the second projection 24' of the second capsule 2' is chosen to be taller than the projection 24 (also referred to as first projection 24) of the capsule 2 of FIG. 1B. It will be appreciated that in this example the second projection 24' of the second capsule 2' is identical to the first projection 24 of the first capsule 2 except for its length. The position of the second projection 24' with respect to the second capsule 2' is also identical to the position of the first projection 24 with respect to the first capsule 2.

As a result, in the example of FIG. 3, when the second capsule 2' is inserted into the brew chamber 32. Then, the second projection 24' of the second capsule 2' lifts the valve head 40 off the seat 44 by a greater distance than when the capsule 2 of FIG. 1B is inserted in the brew chamber 32. Hence, the second projection 24' causes the stem 42 to assume a third position. Hence, the valve 38 is operated in a third mode. In the third mode, the flow rate and/or pressure is adjusted to a third level. The flow rate and/or the pressure in the third mode will be higher than the flow rate and/or pressure in the second mode. It will be appreciated that in this example the length of the respective projections 24, 24' is representative of the flow rate and/or the pressure. The length of the projection may be proportional to the flow rate and/or pressure. It will be appreciated that the flow rate and/or pressure in the third mode can be chosen according to a desired flow rate and/or pressure for preparing a second beverage using the second capsule 2'. It will be appreciated that when providing the first capsule 2 having the first projection 24 and providing the second capsule 2' having the second projection 24' it is not a necessity to design the valve 38 such that it leaks in the closed position as the two actuating members 24, 24' provide operation of the device 4 in two distinct modes.

Alternatively, when a third capsule 2" not having an actuating member is introduced into the brew chamber 32, no actuating member will be present, so that the device 4 automatically provides the fluid with the flow rate and/or pressure at the first level. The first level may be set so as to allow a first beverage to be prepared. This also may provide further versatility in the preparation of beverages.

Thus, it is possible to automatically adjust the flow rate and/or pressure of the fluid to be supplied to the capsule depending on the beverage to be prepared. It is for instance possible to prepare a first beverage, such as American coffee at a relatively low pressure and an espresso coffee at a relatively high pressure. The capsule including the beverage ingredient automatically causes the beverage preparation device 4 to supply the fluid at the desired flow rate and/or pressure depending on the actuating member 22. Thus, in general, it is possible to provide two modes to be selectively actuated based on the presence or absence of the actuating member. It is also possible to provide two modes to be selectively actuated based on a dimension of the respective actuating member, such as the length of the protrusion. It is also possible to provide more than two modes to be selectively activated based on the dimension of the respective actuating member, such as the length of the protrusion. It is also possible to provide more than two modes to be selectively activated based on the dimension of the respective actuating member, such as the length of the protrusion and the presence or absence of the actuating member. It will be appreciated that in all of the above cases one of the modes may represent a rinse mode. It will be appreciated that such rinse mode may easily be provided by providing the valve that purposively leaks in the first mode.

For providing choice options to the consumer, it is possible to provide a kit comprising mutually different capsules, e.g. for preparing mutually different beverages. Such kit may include a first capsule comprising no actuating member and a second capsule comprising an actuating member as described above. Alternatively, such kit may comprise a first capsule comprising a first actuating member and a second capsule comprising a second actuating member, different from the first actuating member, as described above. Herein, the first capsule may comprise a first beverage ingredient and the second capsule may comprise a second beverage ingredient. The first beverage ingredient may be different from the second beverage ingredient. The first beverage ingredient may e.g. differ from the second beverage ingredient in one or more of type, origin, volume, mass, density, composition, grind size, or the like.

It will be appreciated that the first capsule and second capsule of such kit may differ in the presence or absence of the actuating member, or a shape and/or dimension of the respective actuating members. It will be appreciated that it is possible that apart from this a geometry of the first capsule and second capsule of such kit are identical. The first capsule and second capsule of such kit may also differ in the beverage ingredient contained therein.

In the examples of FIGS. 1A, 1B and 3, the valve 38 is mechanically actuated by the actuating member 22 of the capsule. This provides for a mechanically simple and reliable system.

Figure 4A:
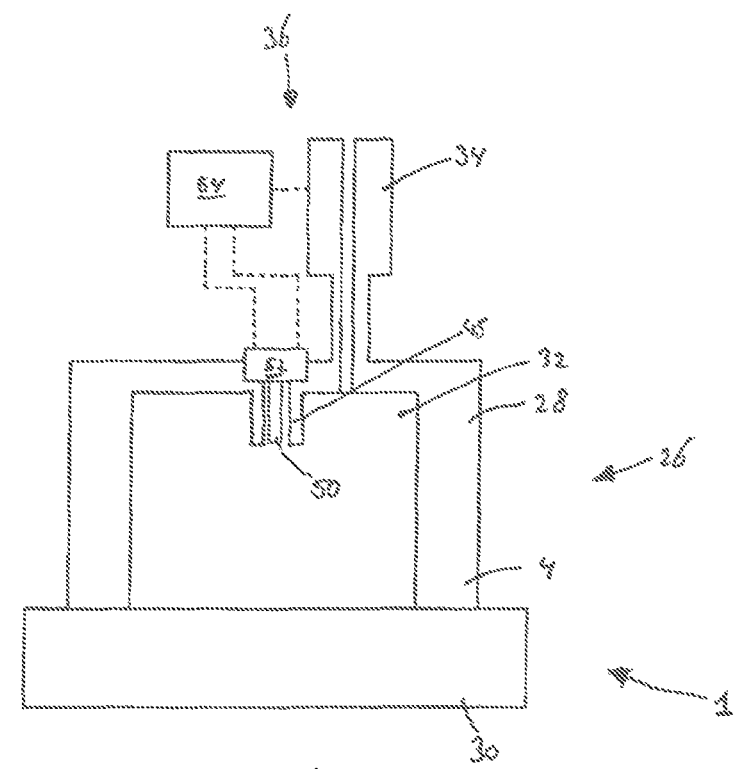
FIGS. 4A and 4B show a schematic representation of a third example of a system according to the invention.
Figure 4B:
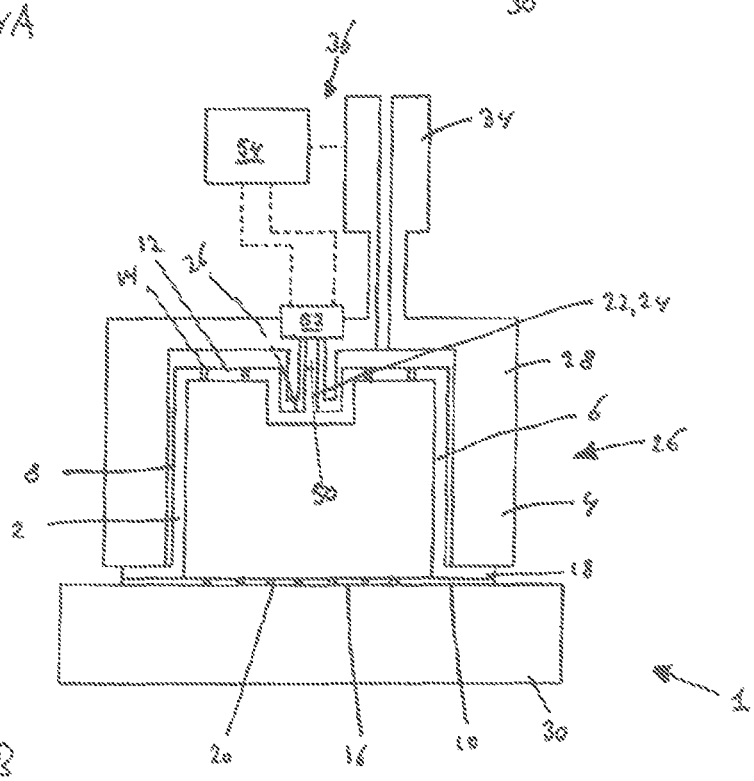

FIGS. 4A and 4B show a schematic representation of a third example of a system according to the invention. In this example, the switching member 50 is formed by the lever of a switch 52. The switch 52 is connected to a controller 54. In this example, the controller 54 is arranged for controlling the fluid supply unit 34. The controller 54 and fluid supply unit 34 are arranged such that the controller 54 can adjust the flow rate and/or pressure of the fluid supplied by the fluid supply unit 34. Thereto, the controller 54 may e.g. control a pump of the fluid supply unit. In this example the flow control unit 36, includes the controller 54 and the switch 52.

The system 1 as shown in FIGS. 4A and 4B can be operated as follows. The system 1 can selectively be operated in a first mode and in a second mode. FIG. 4A depicts the system 1 being used in the first mode. FIG. 4B depicts the system 1 being used in the second mode.

In the first mode, in this example, no capsule 2 is inserted into the brew chamber 32. Then, the switch 52 is not actuated so that the switching member 50 is in the first position as depicted in FIG. 4A. The controller 54 detects the switch 52 not being actuated and instructs the fluid supply unit 34 to supply the fluid to the capsule, such that the flow rate and/or pressure is adjusted to a first level. The flow rate and/or the pressure at the first level is in this example chosen to be sufficient for rinsing the beverage preparation device 4.

In the second mode, in this example, the capsule 2 is inserted into the brew chamber 32. Then, the actuating member 22 of the capsule 2 actuates the switch 52. The length of the projection 24 and a dimension and/or location of a switch lever 50 can be adapted to each other so that the switch detects the presence of the actuating member 22. The switching member 50 is in a second position as depicted in FIG. 4B. The controller 54 detects the switch 52 being actuated and instructs the fluid supply unit 34 to supply the fluid to the capsule, such that the flow rate and/or pressure is adjusted to a second level. The flow rate and/or the pressure at the second level in this example is higher than the flow rate and/or pressure at the first level. It will be appreciated that the flow rate and/or pressure in the second mode can be chosen according to a desired flow rate and/or pressure for preparing a beverage using the capsule 2.

Also, in the second mode, the fluid will be supplied to the capsule 2. The fluid will enter the capsule 2 through the entrance face 12. In the inner space of the capsule 2, the fluid will interact with the beverage ingredient included in the capsule 2, thus forming the beverage. The beverage exits the capsule 2 through the exit face 16. In this example, the beverage exits the brew chamber through the support plate 30. Thereto the support plate may be provided with openings (not shown) for guiding the beverage towards a container, such as a cup.

It will be appreciated that the switch 52 may also be arranged to detect a difference between the switching member 50 being depressed over a first distance and over a different second distance. In such case, the system 1 as described with respect to FIGS. 4A and 4B may also be arranged, mutatis mutandis, to be operated in the third mode as described with respect to FIG. 3.

Thus, the system 1 as shown in FIGS. 4A and 4B may be operated in one of at least the first mode and the second mode. The device may be arranged to, in the first mode, supply the fluid to the first capsule with the flow rate and/or pressure adjusted to the first level, and, in the second mode, supply the fluid to the second capsule with the flow rate and/or pressure adjusted to the second level, different from the first level. It will be appreciated that it is also possible that the controller 54 instructs the fluid supply unit 34 to adjust other parameters, such as volume of the fluid to be supplied to the capsule, time duration supplying the fluid to the capsule, volume and/or pressure of fluid to be supplied to the capsule as a function of time (volume flow and/or pressure profile), and/or temperature of the fluid, e.g. depending on detection of the first or second actuating member.

It is also possible that the switch 52 is designed as a displacement sensor. Hence, a dimension of the actuating member may be determined by the displacement sensor. Thus, a stepless control of the flow rate and/or pressure may be obtained.

FIGS. 5A and 5B show a schematic representation of a third example of a system according to the invention. In this example, the switching member 50 is part of a switch 52, similar to the switch shown in FIGS. 4A and 4B. In this example, the controller 54 is arranged for controlling a valve 38 in a fluid flow path from the fluid supply unit 34 to the brew chamber 32. In this example the flow control unit 36, includes the controller 54, the valve 38 and the switch 52.

The system 1 as shown in FIGS. 5A and 5B can be operated as follows. The system 1 can selectively be operated in a first mode and in a second mode. FIG. 5A depicts the system 1 being used in the first mode. FIG. 5B depicts the system 1 being used in the second mode.

In the first mode, in this example, no capsule 2 is inserted into the brew chamber 32. Then, the switch 52 is not actuated so that the switching member is in the first position as depicted in FIG. 5A. The controller 54 detects the switching member 50 being in the first position and adjusts the valve 38, such that the flow rate and/or pressure is adjusted to a first level. The flow rate and/or the pressure at the first level is in this example chosen to be sufficient for rinsing the beverage preparation device 4.

In the second mode, in this example, the capsule 2 is inserted into the brew chamber 32. Then, the actuating member 22 of the capsule 2 actuates the switch 52 so that the switching member 50 is in the second position as depicted in FIG. 5B. The length of the projection 24 and a dimension and/or location of a switching member 50 can be adapted to each other so that the switch detects the presence of the actuating member 22. The controller 54 detects the switching member 50 being in the second position and adjusts the valve 38, such that the flow rate and/or pressure is adjusted to a second level. The flow rate and/or the pressure at the second level in this example is higher than the flow rate and/or pressure at the first level. It will be appreciated that the flow rate and/or pressure in the second mode can be chosen according to a desired flow rate and/or pressure for preparing a beverage using the capsule 2.

Also, in the second mode, the fluid will be supplied to the capsule 2. The fluid will enter the capsule 2 through the entrance face 12. In the inner space of the capsule 2, the fluid will interact with the beverage ingredient included in the capsule 2, thus forming the beverage. The beverage exits the capsule 2 through the exit face 16. In this example, the beverage exits the brew chamber through the support plate 30. Thereto the support plate may be provided with openings (not shown) for guiding the beverage towards a container, such as a cup.

It will be appreciated that the switch 52 may also be arranged to detect a difference between the switching member 50 being depressed over a first distance and over a different second distance. In such case, the system 1 as described with respect to FIGS. 5A and 5B may also be arranged, mutatis mutandis, to be operated in the third mode as described with respect to FIG. 3.

Thus, the system 1 as shown in FIGS. 5A and 5B may be operated in one of at least the first mode and the second mode. The device may be arranged to, in the first mode, supply the fluid to the first capsule with the flow rate and/or pressure adjusted to the first level, and, in the second mode, supply the fluid to the second capsule with the flow rate and/or pressure adjusted to the second level, different from the first level. It will be appreciated that it is also possible that the controller 54 instructs the fluid supply unit 34 to adjust other parameters, such as volume of the fluid to be supplied to the capsule and/or temperature of the fluid, depending on detection of the first or second actuating member.

It is also possible that the switch 52 is designed as a displacement sensor. Hence, a dimension of the actuating member may be determined by the displacement sensor. Thus, a stepless control of the valve 38, and hence of the flow rate and/or pressure may be obtained.

In the example of FIGS. 5A and 5B the valve 38 is adjusted by electronic control. Alternatively, or additionally, the valve may be actuated by an electric, magnetic, pneumatic and/or hydraulic actuator.

In the examples of FIGS. 4A, 4B, 5A and 5B, the switch 52 comprises an electrical switch. The switch may also comprise a pneumatic or hydraulic switch actuation of which causes the valve to be actuated electrically, magnetically, pneumatically and/or hydraulically and/or causing the controller to instruct the fluid supply unit accordingly.

It is possible that the switch 52 is arranged for optically determining a position of the switching member 50. A possible embodiment is shown in FIGS. 6A-6D. In the example of FIG. 6A-6D the switching member 50 comprises a vane 56. The switch 52 comprises a first light barrier unit 58A and a second light barrier unit 58B. The first light barrier unit 58A comprises a first light source 60A and a first light detector 62A (see FIG. 6D). The first light detector 62A is positioned to receive light emitted by the first light source 60A along a first optical path 64A. The second light barrier unit 58B comprises a second light source 60B and a second light detector 62B arranged similarly.

In this example, when the switching member is not actuated (see FIG. 6A), the vane 56 is positioned in a first position such that it obstructs the first optical path 64A and the second optical path 64B. Hence, the light detectors 62A and 62B detect no light emitted by the sources 60A and 60B, respectively.

When the switching member is actuated, the vane 56 is moved in an axial direction of the switching member 50. When the switching member is depressed over a first distance, the vane 56 may be moved into a second position such that the first optical path 64A is no longer blocked by the vane while the second optical path 64B is still obstructed by the vane 56 (see FIG. 6B). Hence, the first light detectors 62A detects light emitted by the first light sources 60A, while the second light source 62B does not detect light emitted by the second light source 60B. In this example, when the switching member is depressed over a second distance, greater than the first distance, the vane 56 may be moved into a third position such that both the first optical path 64A and the second optical path 64B are no longer blocked by the vane (see FIG. 6C). Hence, both the light detectors 62A,62B detect light emitted by the light sources 60A,60B.

It will be appreciated that the switch 52 may provide information representative of the detected position of the switching member 50 to the controller 54. The controller may process this information and perform the tasks as described above.

It will be appreciated that it is also possible that the switch comprises a single light barrier unit, for detecting whether the vane is in a first position or in a second position. It is also possible that the switch comprises more than two light barrier units, e.g. for detecting more than three different positions of the vane 56. It is also possible that the switch comprises a plurality of light barrier units for determining whether the vane is in the first or in the second position. This may e.g. provide redundancy in the switch.

Figure 6A:
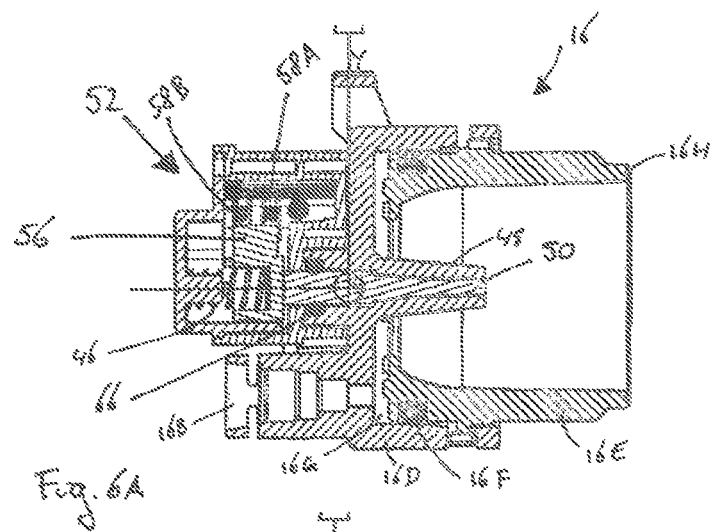
FIGS. 6A-6D show a schematic representation of a fourth example of a system according to the invention.
Figure 6B:
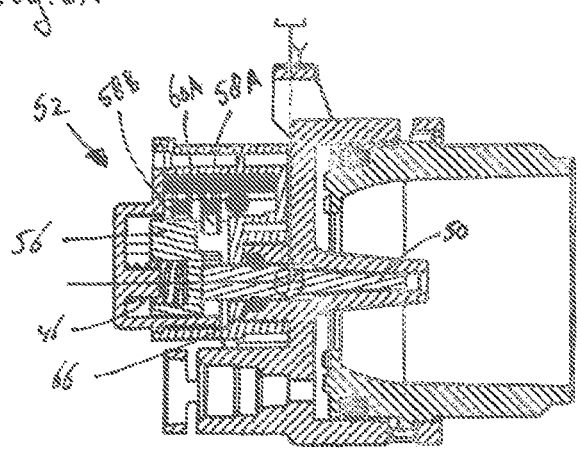
Figure 6C:
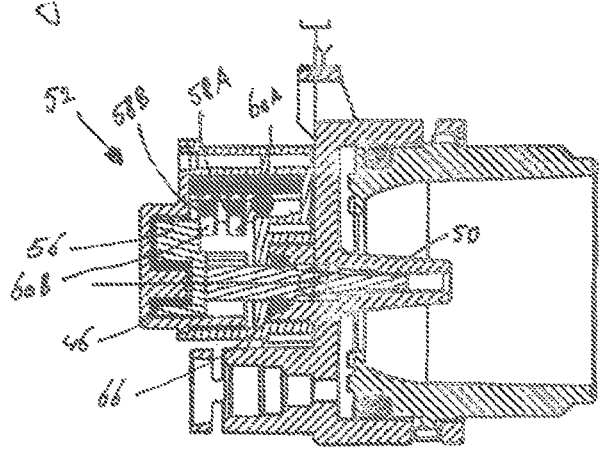
Figure 6D:
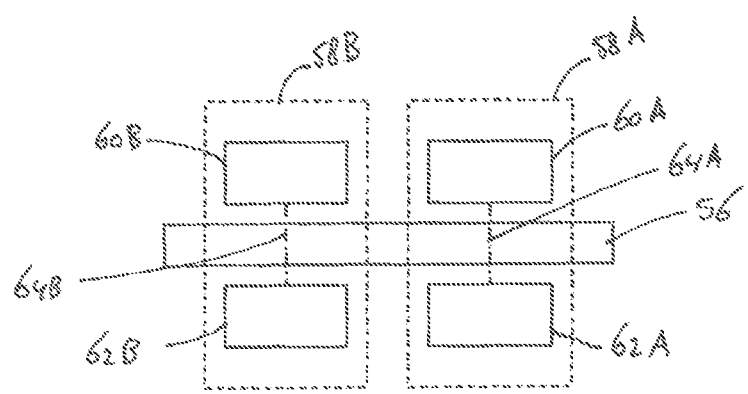

In the example of FIGS. 6A-6C the switch 52 comprises a seal 66 preventing fluid leakage in between the switching member 52 and the enclosing member 28. In the example of FIGS. 6A-6C the spring 46 is arranged for returning the switching member 50 to the first position when not actuated.

In the example of FIGS. 6A-6D, the vane 56 is part of the switching member 50. It will be appreciated that it is also possible that the vane is part of the actuating member of the capsule. Then, the vane of the capsule can selectively obstruct or free the optical path of the (at least one) light barrier unit.

Figure 7A:
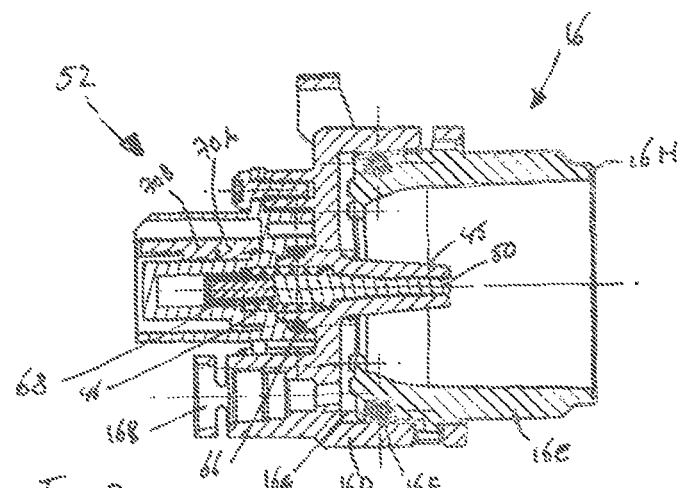
FIGS. 7A-7C show a schematic representation of an fifth example of a system according to the invention.
Figure 7B:
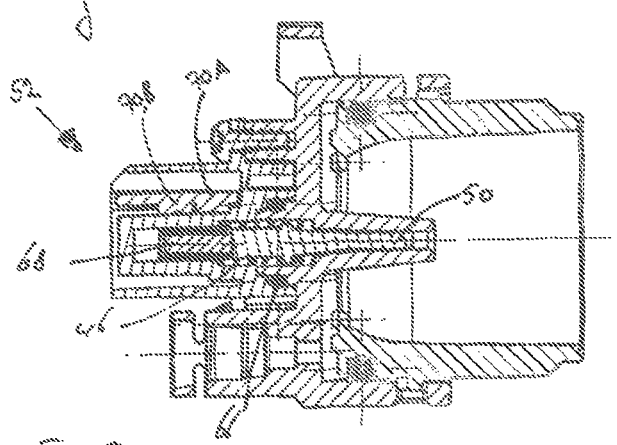
Figure 7C:
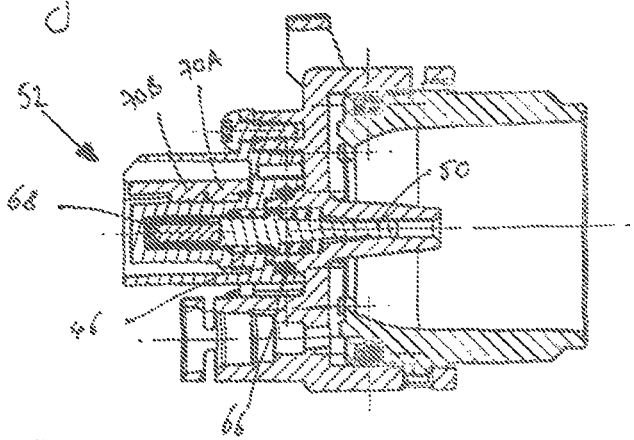

It is also possible that the switch 52 is arranged for magnetically determining a position of the switching member 50. A possible embodiment is shown in FIGS. 7A-7C. In the example of FIG. 7A-7C the switching member 50 comprises a magnetic indicator 68. In this example the magnetic indicator 68 is a permanent magnet. The switch 52 comprises a first magnetic induction sensor 70A and a second magnetic induction sensor 70B. The first magnetic induction sensor 70A in this example comprises a first Hall sensor. The second magnetic induction sensor 70B in this example comprises a second Hall sensor.

In this example, when the switching member is not actuated (see FIG. 7A), the magnet 68 is positioned in a first position such that it is sufficiently near to the first magnetic induction sensor 70A, so that the first magnetic induction sensor 70A detects the presence of the magnet 68. In the first position, the magnet 68 is sufficiently remote from the second magnetic induction sensor 70B, so that the second magnetic induction sensor 70B does not detect the presence of the magnet 68.

When the switching member is actuated, the magnet 68 is moved in an axial direction of the switching member 50. When the switching member is depressed over a first distance, the magnet 68 may be moved into a second position such that it is sufficiently near to both the first and second magnetic induction sensors 70A, 70B, so that both the first and second magnetic induction sensors 70A, 70B detect the presence of the magnet 68. In this example, when the switching member is depressed over a second distance, greater than the first distance, the magnet 68 may be moved into a third position such that it is sufficiently remote from the first magnetic induction sensor 70A, so that the first magnetic induction sensor 70A does not detect the presence of the magnet 68, and that the magnet 68 is sufficiently near to the second magnetic induction sensor 70B, so that the second magnetic induction sensor 70B detects the presence of the magnet 68.

It will be appreciated that the switch 52 may provide information representative of the detected position of the switching member 50 to the controller 54. The controller may process this information and perform the tasks as described above.

It will be appreciated that it is also possible that the switch comprises a single magnetic induction sensor, for detecting whether the magnet is in a first position or in a second position. It is also possible that the switch comprises more than two magnetic induction sensors, e.g. for detecting more than three different positions of the magnet 68. It is also possible that the switch comprises a plurality of magnetic induction sensors for determining whether the magnet is in the first or in the second position. This may e.g. provide redundancy in the switch.

In the example of FIGS. 7A-7C the switch 52 comprises a seal 66 preventing fluid leakage in between the switching member 52 and the enclosing member 28. In the example of FIGS. 7A-7C the spring 46 is arranged for returning the switching member 50 to the first position when not actuated.

In the example of FIGS. 7A-7C the magnetic indicator 68 is a permanent magnet. It is also possible that the magnetic indicator is a magnetisable indicator, such as a ferromagnetic material. In such case the magnetic induction detectors 70A, 70B may be provided with magnetising means, such as a permanent magnet or an electromagnet, for magnetising the magnetisable indicator.

In the example of FIGS. 7A-7C, the magnetic indicator 68 is part of the switching member 50. It will be appreciated that it is also possible that the magnetic indicator is part of the actuating member of the capsule. Then, the magnetic indicator of the capsule can selectively be detected by the (at least one) magnetic induction sensor.

In the examples FIGS. 6A-6C and 7A-7C, the enclosing member 16 includes a rear portion 16D and a front portion 16E. The front portion 16E is mobile with respect to the rear portion 16D along an axial direction of the enclosing member 16. The rear portion 16D and front portion 16E are connected via a sealing member 16F. The sealing member sealingly connects the rear portion 16D and the front portion 16E. further, between the rear portion 16D and the front portion 16E a gap 16G is provided. Once liquid is injected into the enclosing member 16 via the supply duct 16B, the liquid fills the gap 16G. Pressure built up in the gap 16G will force the rear portion 16D and the front portion 16E apart. As a result, the front portion 16E, e.g. a leading edge 16H of the front portion 16E, will be pressed against the capsule 2 when present. Preferably, the leading edge 16H is pressed against the flange-like rim 10 of the capsule 2. This may improve sealing of the enclosing member 16 against the capsule 2.

In the foregoing specification, the invention has been described with reference to specific examples of embodiments of the invention. It will, however, be evident that various modifications and changes may be made therein without departing from the broader spirit and scope of the invention as set forth in the appended claims.

In the examples, the flow control unit is operated to function in one of a plurality of discrete modes. It will be appreciated that the control unit may also be operated in any mode in between these discrete modes. Thus, stepless control of the flow rate and/or pressure between a minimum and maximum level is provided. It is possible that the flow rate is proportional to a length of the projection of the capsule. It is also possible that the pressure is proportional to the length of the projection of the capsule.

In the examples, the switching member 50 is positioned in the recess 47 of the inner wall of the capsule holder, and the actuating member 22 is positioned in the recess 26 of an outer contour of the capsule. It will be appreciated that the advantages of the invention may also, at least partially, be obtained when only the switching member is positioned in the recess of the inner wall of the capsule holder, or when only the actuating member is positioned in the recess of the outer contour of the capsule. Alternatively, neither the switching member nor the actuating member may be recessed.

In the examples, the inner wall of capsule holder comprises the protruding portion, and the switching member is recessed with respect to said protruding portion. It will be appreciated that it is also possible that an outer wall of the capsule, e.g. the cup-shaped body, comprises a protruding portion, and the actuating member is recessed with respect to said protruding portion.

In the example of FIG. 3 the actuating member projects beyond the outer contour of the capsule. It will be appreciated that it is also possible to provide mutually different actuating members, e.g. having mutually different lengths, for providing two or more operating modes, wherein all actuating members remain within the outer contour of the respective capsule.

In the examples, the entrance face and exit face of the capsules were described as perforate. It will be appreciated that it is also possible that the entrance face and/or the exit face is porous. It is also possible that the entrance face and/or exit face is fluid tight, e.g. in case the device is arranged for opening, such as by piercing, the entrance face and/or exit face, respectively.

However, other modifications, variations, and alternatives are also possible. The specifications, drawings and examples are, accordingly, to be regarded in an illustrative rather than in a restrictive sense.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

The invention claimed is:

1. A system for preparing a beverage using a capsule, the system comprising:
    a beverage preparation device and a capsule,
    wherein the capsule comprises:
        a cup-shaped body, the body comprising a first recess,
        a lid for closing the body, and
        an actuating member positioned at least partially within the first recess;
    wherein the device comprises:
        a capsule holder arranged for holding the capsule, the capsule holder comprising a second recess configured to receive the actuating member of the capsule,
        a fluid supply unit arranged for supplying a fluid towards the capsule when the capsule is in the capsule holder,
        a flow control unit arranged for controlling a parameter of fluid to be supplied towards the capsule, wherein the flow control unit is arranged for selectively operating in one of at least a first mode and a second mode,
        wherein in the first mode the parameter is adjusted to a first level, and in the second mode the parameter is adjusted to a second level, different from the first level,
        wherein the flow control unit comprises a switching member movable relative to the second recess between a first position and a second position, the switching member positioned at least partially within the second recess and being arranged for being engaged by the actuating member of the capsule to be positioned in the first or second position when the capsule is in the capsule holder, and
        wherein the flow control unit is in the first mode when the switching member is in the first position, and wherein the flow control unit is in the second mode when the switching member is in the second position.

2. The system according to claim 1, wherein the parameter is one or more of
    flow rate,
    pressure,
    volume,
    temperature,
    time duration of supplying the fluid towards the capsule,
    flow rate of the fluid to be supplied towards the capsule as a function of time,
    pressure of the fluid to be supplied towards the capsule as a function of time,
    volume of the fluid to be supplied towards the capsule as a function of time, and
    temperature of the fluid to be supplied towards the capsule as a function of time.

3. The system according to claim 1, wherein the inner wall of the capsule holder comprises a protruding portion, and the switching member is recessed with respect to said protruding portion.

4. The system according to claim 1, wherein the switching member is recessed with respect to the inner wall of the capsule holder, and wherein the actuating member is recessed with respect to the outer contour of the capsule.

5. The system according to claim 4, wherein the inner wall of the capsule holder comprises a protruding portion, and the switching member is recessed with respect to said protruding portion, wherein the protruding portion of the inner wall of the capsule holder extends into the first recess of the capsule when the capsule is in the capsule holder.

6. The system according to claim 1, wherein the actuating member is positioned at an axis of symmetry of the capsule.

7. The system according to claim 6, wherein the switching member is positioned at an axis coaxial with the axis of symmetry of the capsule when the capsule is in the capsule holder.

8. The system according to claim 1, wherein at least part of the switching member is positioned coaxial with the actuating member when the capsule is in the capsule holder.

9. The system according claim 1 one of the preceding claims, wherein the actuating member is a projection of the capsule.

10. The system according to claim 9, wherein the projection is comprised in the first recess of the capsule, such that the projection substantially resides within an outer contour of the cup-shaped body.

11. The system according to claim 1, comprising optical detection means for detecting the position of the switching member.

12. The system according to claim 11, wherein the optical detection means comprise at least one light barrier unit.

13. The system according to claim 12, wherein the switching member comprises a vane for selectively obstructing or freeing an optical path of the at least one light barrier unit.

14. The system according to claim 1, comprising magnetic detection means for detecting the position of the switching member.

15. The system according to claim 14, wherein the magnetic detection means comprise at least one magnetic induction sensor.

16. The system according to claim 15, wherein the switching member comprises a magnetic indicator for being detected by the magnetic induction sensor.

17. The system according to claim 1, comprising optical detection means for detecting the position of the actuating member.

18. The system according to claim 17, wherein the optical detection means comprise at least one light barrier unit.

19. The system according to claim 18, wherein the actuating member comprises a vane for selectively obstructing or freeing an optical path of the at least one light barrier unit.

20. The system according to claim 1, comprising magnetic detection means for detecting the position of the actuating member.

21. The system according to claim 20, wherein the magnetic detection means comprise at least one magnetic induction sensor.

22. The system according to claim 20, wherein the actuating member comprises a magnetic indicator for being detected by the magnetic detection means.

23. The system according to claim 1, wherein the flow control unit comprises a valve for controlling the flow rate and/or pressure of the fluid.

24. The system according to claim 23, wherein the valve is designed as a leaking valve, such that in the first mode the valve is in a closed position but allowed to leak, and in the second mode the valve is in an open position.

25. The system according to claim 23, wherein the valve is mechanically actuated by the actuating member of the capsule.

26. The system according to claim 23, wherein the valve is actuated by an actuator which in turn is activated by the switching member, wherein the actuator is one of electronic, electric, magnetic, pneumatic or hydraulic, or a combination thereof.

27. The system according to claim 1, wherein the flow control unit is arranged for instructing the fluid supply unit to control the flow rate and/or pressure of the fluid supplied to the capsule.

28. The system according to claim 1, wherein the flow rate and/or pressure in the first mode is smaller than the flow rate and/or pressure in the second mode.

29. The system according to claim 1, wherein the switching member is in the first position when the switching member is not engaged by an actuating member of a capsule.

30. The system according to claim 1, wherein the switching member is in the second position upon engagement by an actuating member of a capsule.

31. The system according to claim 30, wherein the switching member is in the first position when the switching member is not engaged by an actuating member of a capsule, wherein the switching member is in the first position upon engagement by a different actuating member of a capsule.

32. The system according to claim 1, wherein the flow control unit is arranged for further operating in a third mode, wherein in the third mode the parameter is adjusted to a third level, different from the first level and the second level.

33. The system according to claim 32, wherein the flow control unit is in the third mode when the switching member is in a third position, different from the first position and second position.

34. The system according to claim 33, wherein the switching member is in the third position upon engagement by a further different actuating member of a capsule.

35. The system according to claim 1, wherein the capsule comprises a beverage ingredient, preferably an extractable product, such as roast and ground coffee.

36. The system according to claim 1, wherein the capsule comprises a porous and/or perforate entrance face and/or exit face for allowing fluid to enter and/or beverage to exit the capsule, respectively.

37. Beverage preparation device of the system according to claim 1.

38. The capsule of the system according to claim 1.

39. The capsule for use in the beverage preparation device of the system according to claim 1, wherein the capsule comprises a cleaning agent and/or descaling agent.

40. Use of a capsule in a beverage preparation device according to claim 37 for preparing a beverage.

41. A capsule for preparing a consumable beverage in a beverage preparation device having a switching member located in a first recess of a flow control unit, the capsule comprising:
a cup-shaped body, the body comprising a second recess,
a lid for closing the body, and
an actuating member arranged at least partially within the second recess and configured to engage and move the switching member in, and relative to, the first recess of the beverage preparation device to affect a flow parameter of fluid to be supplied to the capsule.

42. The capsule according to claim 41, wherein the actuating member is a projection of the capsule.

43. The capsule according to claim 42, wherein the projection is comprised in a recess of the capsule, such that the projection substantially resides within an outer contour of the cup-shaped body.

44. The capsule according to claim 41, wherein the actuating member is a recess of the capsule.

45. The capsule according to claim 43, wherein the recess is positioned in the cup-shaped body opposite the lid.

46. The capsule according to claim 41, wherein the actuating member is positioned at the cup-shaped body opposite the lid.

47. The capsule according to claim 41, wherein the actuating member is positioned at an axis of symmetry of the capsule.

48. The capsule according to claim 41, wherein the actuating member and the cup-shaped body form a monolithic part.

49. The capsule according to claim 41, wherein the actuating member is arranged as a vane for selectively obstructing or freeing an optical path of a light barrier unit.

50. The capsule according to claim 41, wherein the actuating member comprises a magnetic indicator, such as a magnet and/or a magnetisable part.

51. The capsule according to claim 41, wherein the capsule comprises a circumferential rim.

52. The capsule according to claim 41, wherein the capsule comprises a beverage ingredient, preferably an extractable product, such as roast and ground coffee.

53. The capsule according to claim 41, wherein the capsule comprises a porous and/or perforate entrance face and/or exit face for allowing fluid to enter and/or beverage to exit the capsule, respectively.

* * * * *